(12) United States Patent
Li et al.

(10) Patent No.: US 12,514,050 B2
(45) Date of Patent: Dec. 30, 2025

(54) PIXEL STRUCTURE, DISPLAY PANEL, AND DISPLAY DEVICE

(71) Applicant: Ledman Optoelectronic Co., Ltd., Guangdong (CN)

(72) Inventors: Mantie Li, Guangdong (CN); Ling Xie, Guangdong (CN); Menglong Tu, Guangdong (CN)

(73) Assignee: Ledman Optoelectronic Co., Ltd., Shenzhen (CN)

(*) Notice: Subject to any disclaimer, the term of this patent is extended or adjusted under 35 U.S.C. 154(b) by 787 days.

(21) Appl. No.: 17/362,837

(22) Filed: Jun. 29, 2021

(65) Prior Publication Data
US 2021/0327959 A1     Oct. 21, 2021

Related U.S. Application Data

(63) Continuation of application No. PCT/CN2020/103670, filed on Jul. 23, 2020.

(30) Foreign Application Priority Data

Jul. 26, 2019    (CN) .......................... 201921207314.3
Jun. 18, 2020    (CN) .......................... 202021141796.X

(51) Int. Cl.
*H10H 29/14*     (2025.01)
*H10H 20/85*     (2025.01)
*H10H 20/857*    (2025.01)

(52) U.S. Cl.
CPC ...... *H10H 29/142* (2025.01); *H10H 20/8506* (2025.01); *H10H 20/857* (2025.01)

(58) Field of Classification Search
CPC ..... H01L 27/156; H01L 33/486; H01L 33/62; H10H 29/142; H10H 20/8506; H10H 20/857
See application file for complete search history.

(56) References Cited

U.S. PATENT DOCUMENTS

| 8,026,669 B2 * | 9/2011 | Kawasaki | ............ G09G 3/2003 |
| | | | 315/169.3 |
| 8,552,636 B2 * | 10/2013 | Chaji | ................... H10K 59/121 |
| | | | 313/503 |

(Continued)

FOREIGN PATENT DOCUMENTS

CN    204029292 U    12/2014
CN    106298753 A    1/2017

(Continued)

OTHER PUBLICATIONS

Extended European Search Report dated Mar. 2, 2022, issued by the European Patent Office in corresponding application EP 20846067.5.

(Continued)

*Primary Examiner* — Eugene Lee
(74) *Attorney, Agent, or Firm* — Stein IP LLC

(57) ABSTRACT

A pixel structure, a display panel, and a display device. The pixel structure comprises a plurality of pixel groups arranged in an array and each comprises a first sub-pixel, a second sub-pixel, and a third sub-pixel; a line connecting the centers of the first sub-pixel, the second sub-pixel and the third sub-pixel forms a first virtual isosceles right triangle; in two adjacent pixel groups arranged in a row direction of the array, a line connecting the centers of the second sub-pixel and the third sub-pixel of one pixel group and the first sub-pixel of the other pixel group forms a second virtual isosceles right triangle; in two adjacent pixel groups in a column direction of the array, a line connecting the centers of the first sub-pixel and the second sub-pixel of one pixel group and the third sub-pixel of the other pixel group forms a third virtual isosceles right triangle.

9 Claims, 6 Drawing Sheets

(56) References Cited

U.S. PATENT DOCUMENTS

| | | | |
|---|---|---|---|
| 8,860,642 B2* | 10/2014 | Phan | G09G 3/20 345/589 |
| 9,818,803 B2* | 11/2017 | Lee | H10K 59/353 |
| 9,978,321 B2* | 5/2018 | Tsuruma | G09G 3/3607 |
| 10,325,540 B2* | 6/2019 | Qin | G09G 3/2003 |
| 2003/0160915 A1* | 8/2003 | Liu | G02F 1/133514 349/106 |
| 2003/0218618 A1* | 11/2003 | Phan | H04N 9/30 345/629 |
| 2008/0225143 A1 | 9/2008 | Joffer et al. | 348/280 |
| 2016/0093019 A1* | 3/2016 | Ayers | G06T 3/4053 382/299 |
| 2016/0117969 A1* | 4/2016 | Qin | G09G 3/2003 345/55 |
| 2016/0254317 A1* | 9/2016 | Xie | H01L 25/0753 257/89 |
| 2017/0084588 A1 | 3/2017 | Wu et al. | 33/486 |
| 2017/0170200 A1* | 6/2017 | Ikeda | G09G 3/2003 |
| 2019/0189044 A1 | 6/2019 | Perälä et al. | |
| 2019/0206313 A1 | 7/2019 | Xia et al. | |
| 2021/0360154 A1* | 11/2021 | Slobodin | H04N 23/90 |

FOREIGN PATENT DOCUMENTS

| | | |
|---|---|---|
| CN | 205881361 U | 1/2017 |
| CN | 206021812 U | 3/2017 |
| CN | 206076230 U | 4/2017 |
| CN | 107146838 A | 9/2017 |
| CN | 107256921 A | 10/2017 |
| CN | 107492546 A | 12/2017 |
| CN | 109903684 A | 6/2019 |
| JP | H 04-113466 A | 4/1992 |
| JP | 2009-230096 A | 10/2009 |
| JP | 2015-19068 A | 1/2015 |
| KR | 10-2015-0007961 A | 1/2016 |

OTHER PUBLICATIONS

Examination Report No. 1 for Standard Patent Application dated Jun. 17, 2022, issued by the Australian Patent Office in corresponding application AU 2020323022.

Notice of Reasons for Refusal dated Jun. 28, 202, issued by the Japanese Patent Office in corresponding application JP 2021-538834.

Canadian Office Action dated Oct. 31, 2022, issued by the Canadian Intellectual Property Office in corresponding application CA 3,125,304.

Korean Office Action dated Dec. 8, 2022, issued by the Korean Intellectual Property Office in corresponding application KR 10-2021-7020274.

Notice of Reasons for Refusal dated Jan. 17, 2023, issued by the Japanese Patent Office in corresponding application JP 2021-538834.

Notice of Final Rejection in counterpart Korean patent application No. 10-2021-7020274 dated Mar. 7, 2023.

Notice of Final Rejection in counterpart Korean patent application No. 10-2021-7020274 dated Jun. 27, 2023.

Decision on invalidation request dated May 12, 2025, issued to Chinese Patent Application No. 202021141796.X.

* cited by examiner

PIXEL STRUCTURE, DISPLAY PANEL, AND DISPLAY DEVICE

CROSS-REFERENCE TO RELATED APPLICATIONS

The present application is a continuation of International Application No. PCT/CN2020/103670 filed on Jul. 23, 2020, which claims priorities to Chinese Patent Application No. 201921207314.3 filed on Jul. 26, 2019 and Chinese Patent Application No. 202021141796.X filed on Jun. 18, 2020. All applications are incorporated herein by reference in their entireties.

TECHNICAL FIELD

The present application relates to the technical field of display, and in particular to a pixel structure, a display panel, and a display device.

BACKGROUND

At present, a COB (chip on board) display panel on the market generally has a pixel pitch of 2 mm. In order to improve the resolution of the display panel, it is necessary to reduce the pixel pitch, which in turn needs to use more pixels and leads to increased cost. On the other hand, in the conventional technology, it is difficult to reduce the pixel pitch to 0.9 mm or less.

SUMMARY

The present application provides a high-resolution pixel structure, a display panel, and a display device.

In an embodiment, there is provided a pixel structure, comprising a plurality of pixel groups arranged in an array to form an array structure and each comprising a first sub-pixel, a second sub-pixel and a third sub-pixel in a ratio of 1:1:1; in each of the pixel groups, a line connecting the centers of the first sub-pixel, the second sub-pixel and the third sub-pixel forms a first virtual isosceles right triangle; the second sub-pixel constitutes the right-angle vertex of the first virtual isosceles right triangle, and the first sub-pixel, the second sub-pixel, and the third sub-pixel in each pixel group are arranged in the same manner; in every two adjacent pixel groups in a same row of the array structure, a line connecting the centers of the second sub-pixel and the third sub-pixel of one pixel group and the first sub-pixel of the other pixel group forms a second virtual isosceles right triangle; and in every two adjacent pixel groups in a same column of the array structure, a line connecting the centers of the first sub-pixel and the second sub-pixel of one pixel group and the third sub-pixel of the other pixel group forms a third virtual isosceles right triangle.

The above pixel structure uses the "virtual pixel" technology (i.e., a technology that uses the persistence of human eyes to time-multiplex real pixels to reproduce more virtual pixels). When the pixel structure is applied to a display panel, with the same number of sub-pixels, the resolution of the display panel is 4 times that of a real pixel display panel, so that the resolution of the display panel can be improved, and therefore the cost of the display panel is reduced.

In an embodiment, there is provided a display panel, comprising the pixel structure as described above.

In an embodiment, there is provided a display panel, comprising a circuit board, and a plurality of pixel groups arranged in an array to form an array structure; each pixel group comprises a first chip, a second chip and a third chip in a ratio of 2:1:1, and the first chip, the second chip and the third chip are formed on a same side of the circuit board;

in each pixel group, the first chip, the second chip and the third chip are at four vertices of a virtual square, respectively, and all the first chips are at two vertices on one diagonal of the virtual square; and the first chip, the second chip, and the third chip in each pixel group are arranged in the same manner.

In an embodiment, there is further provided a display device, comprising the display panel as described above.

DETAILED DESCRIPTION

In order to make the purposes, technical solutions, and advantages of the present application more clear, the present application will be further described in detail below in conjunction with the accompanying drawings and specific embodiments. It should be understood that the specific embodiments described herein are merely illustrative of the present application and are not intended to limit the scope of the present application.

Unless defined otherwise, all technical and scientific terms used herein have the same meaning as commonly understood by those skilled in the art to which this application belongs. The terminology used herein in the description of the present application is for the purpose of describing the specific embodiments only and is not intended to be limiting of the present application. As used herein, the term "and/or" includes any and all combinations of one or more of the associated listed items.

The terms "first" and "second" in the present application do not denote a particular quantity or order, but merely serve to distinguish between names.

Figure 1:
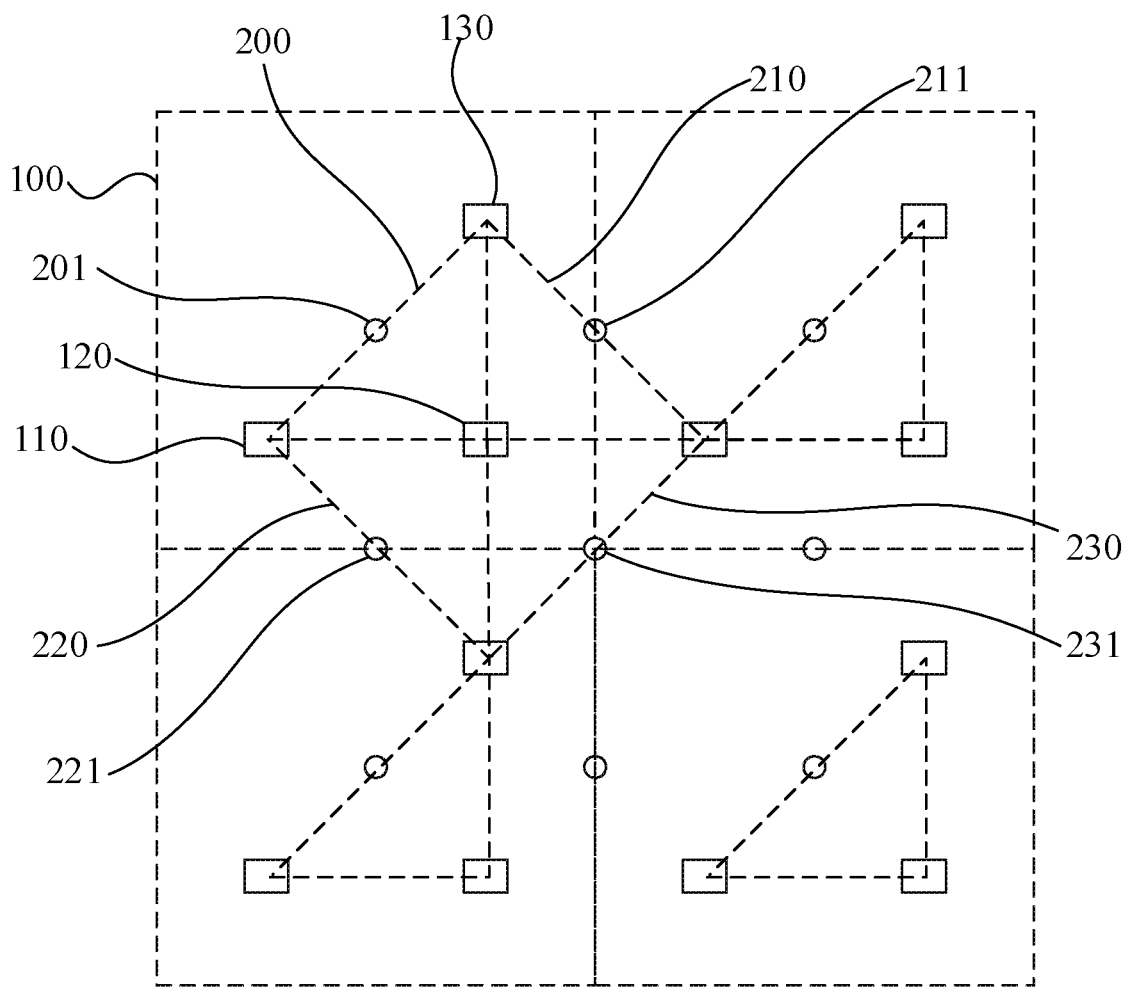
FIG. 1 shows a schematic diagram of a pixel structure according to an embodiment of the present application.

As shown in FIG. 1, an embodiment of the present application relates to a pixel structure 10 comprising a plurality of pixel groups 100 arranged in an array and each comprising a first sub-pixel 110, a second sub-pixel 120, and a third sub-pixel 130 in a ratio of 1:1:1. Specifically, in an embodiment, each pixel group 100 comprises one first sub-pixel 110, one second sub-pixel 120, and one third sub-pixel 130, and each of the first sub-pixel 110, the second sub-pixel 120 and the third sub-pixel 130 is a red light emitting chip, a blue light emitting chip, or a green light emitting chip, and the first sub-pixel 110, the second sub-pixel 120, and the third sub-pixel 130 emit light of different colors. Of course, the first sub-pixel 110, the second sub-pixel 120, or the third sub-pixel 130 may emit light of colors other than red, blue, and green.

In each pixel group 100, the first sub-pixel 110 and the second sub-pixel 120 are arranged in a first direction, the second sub-pixel 120 and the third sub-pixel 130 are arranged in a second direction, and a line connecting the centers of the first sub-pixel 110, the second sub-pixel 120 and the third sub-pixel 130 forms a first virtual isosceles right triangle 200. Specifically, the centers of the first sub-pixel 110, the second sub-pixel 120, and the third sub-pixel 130 constitute the three vertices of the first virtual isosceles right triangle 200, respectively. Here, the second sub-pixel 120 constitutes the right-angle vertex of the first virtual isosceles right angle triangle 200.

Here, in every two adjacent pixel groups 100 in a same row of the array structure, a line connecting the centers of the second sub-pixel 120 and the third sub-pixel 130 of one pixel group 100 and the first sub-pixel 110 of the other pixel group 100 forms a second virtual isosceles right triangle 210; and in every two adjacent pixel groups 100 in a same column of the array structure, a line connecting the centers of the first sub-pixel 110 and the second sub-pixel 120 of one pixel group 100 and the third sub-pixel 130 of the other pixel group 100 forms a third virtual isosceles right triangle 220. Naturally, a line connecting the centers of the second sub-pixel 120 of one pixel group 100, the first sub-pixel 110 of a pixel group 100 adjacent to the aforementioned pixel group 100 in the row direction of the array structure, and the third sub-pixel 130 of a pixel group 100 adjacent to the aforementioned pixel group 100 in the column direction of the array structure forms a fourth virtual isosceles right triangle 230. Specifically, taking the pixel structure 10 shown in FIG. 1 as an example: a line connecting the centers of the first sub-pixel 110, the second sub-pixel 120 and the third sub-pixel 130 of a pixel group 100 in line 1, column 1 forms a first virtual isosceles right triangle 200; a line connecting the centers of the second sub-pixel 120 and the third sub-pixel 130 of the pixel group 100 in line 1, column 1 and the first sub-pixel 110 of a pixel group 100 in line 1, column 2 forms a second virtual isosceles right triangle 210; a line connecting the centers of the first sub-pixel 110 and the second sub-pixel 120 of the pixel group 100 in line 1, column 1 and the third sub-pixel 130 of a pixel group 100 in line 2, column 1 forms a third virtual isosceles right triangle 220; and a line connecting the centers of the second sub-pixel 120 of the pixel group 100 in line 1, column 1, the first sub-pixel 110 of the pixel group 100 in line 1, column 2, and the third sub-pixel 130 in the pixel group 100 in line 2, column 1 forms a fourth virtual isosceles right triangle 230.

The above pixel structure uses the "virtual pixel" technology (i.e., a technology that uses the persistence of human eyes to time-multiplex real pixels to reproduce more virtual pixels). in the pixel structure 10, when the first sub-pixel 110, the second sub-pixel 120 and the third sub-pixel 130 are lighted, a first pixel 201 is formed at the circumcenter of the first virtual isosceles right triangle 200; a second pixel 211 is formed at the circumcenter of the second virtual isosceles right triangle 210; a third pixel 221 is formed at the circumcenter of the third virtual isosceles right triangle 220; and a fourth pixel 231 is formed at the circumcenter of the fourth virtual isosceles right triangle 230. In this way, when the pixel structure 10 is applied to a display panel, under the condition that the display panel has the same number of sub-pixels as a real pixel display panel, the resolution of the display panel can be improved, and therefore the cost of the display panel is reduced.

In an embodiment, a plurality of pixel groups 100 are arranged in an array to form an array structure, all the pixel groups 100 in the array structure are arranged at even intervals in a row direction, and all the pixel groups 100 in the array structure are arranged at even intervals in a column direction. In this way, all the pixel groups 100 in the entire pixel structure 10 are uniformly arranged, thereby ensuring the uniformity of light emission.

Specifically, the first direction is consistent with the row direction of the array structure, the second direction is consistent with the column direction of the array structure, the first sub-pixels 110 and the second sub-pixels 120 of all pixel groups 100 in a same row of the array structure are in a same straight line, and the third sub-pixels 130 of all pixel groups 100 in a same row are in a same straight line; and the second sub-pixels 120 and the third sub-pixels 130 of all pixel groups 100 in a same column of the array structure are in a same straight line, and the first sub-pixels 110 in all pixel groups 100 in a same column are in a same straight line. The circumcenters of all first virtual isosceles right triangles 200 in a same row of the array structure are in a same straight line; and the circumcenters of all first virtual isosceles right triangles 200 in a same column of the array structure are in a same straight line. In this way, all the first pixels 201 which may be formed by the pixel structure 10 are in array arrangement, and the first pixels 201 in a same row in the pixel structure 10 are in a same straight line, and the first pixels 201 in a same column are in a same straight line, so that the first pixels 201 are uniformly distributed, thereby ensuring the uniformity of light emission.

Further, a line connecting the circumcenters of every two adjacent first virtual isosceles right triangles 200 in a same row of the array structure is consistent in length; and a line connecting the circumcenters of every two adjacent first virtual isosceles right triangles 200 in a same column of the array structure is consistent in length. In this way, in all the first pixels 201 in a same row in the pixel structure 10, the distance between every two adjacent first pixels 201 is consistent, and in all the first pixels 201 in a same column in the pixel structure 10, the distance between every two adjacent first pixels 201 is consistent. In this way, the first pixels 201 are uniformly distributed, thereby ensuring the uniformity of light emission. Further, the length of the line connecting the circumcenters of every two adjacent first virtual isosceles right triangles 200 in a same row of the array structure is twice the length of a right-angle side of the first virtual isosceles right triangle 200. Therefore, in two adjacent pixel groups 100 in a same row, a line connecting the centers of the second sub-pixel 120 and the third sub-pixel 130 of the left pixel group 100 and the first sub-pixel 110 of the right pixel group 100 may form a second virtual isosceles right triangle 210, and a second pixel 211 may be formed at the circumcenter of the second virtual isosceles right triangle 210. The length of the line connecting the circumcenters of every two adjacent first virtual isosceles right triangles 200 in a same column of the array structure are twice the length of a right-angle side of the first virtual isosceles right triangle. Therefore, in two adjacent pixel groups 100 in a same column, a line connecting the centers of the first sub-pixel 110 and the second sub-pixel 120 of the upper pixel group 100 and the third sub-pixel 130 of the lower pixel group 100 may form a third virtual isosceles right triangle 220, and a third pixel 221 may be formed at the circumcenter of the third virtual isosceles right triangle 220.

The above pixel structure uses the "virtual pixel" technology (i.e., a technology that uses the persistence of human eyes to time-multiplex real pixels to reproduce more virtual pixels). In the above pixel structure 10, a first pixel 201 is formed at the circumcenter of the first virtual isosceles right triangle 200; a second pixel 211 is formed at the circumcenter of the second virtual isosceles right triangle 210; a third pixel 221 is formed at the circumcenter of the third virtual isosceles right triangle 220; and a fourth pixel 231 is formed at the circumcenter of the fourth virtual isosceles right triangle 230. In this way, when the pixel structure 10 is applied to a display panel, under the condition that the display panel has the same number of sub-pixels as a real pixel display panel, the resolution of the display panel can be improved, and therefore the cost of the display panel is reduced.

Figure 2:
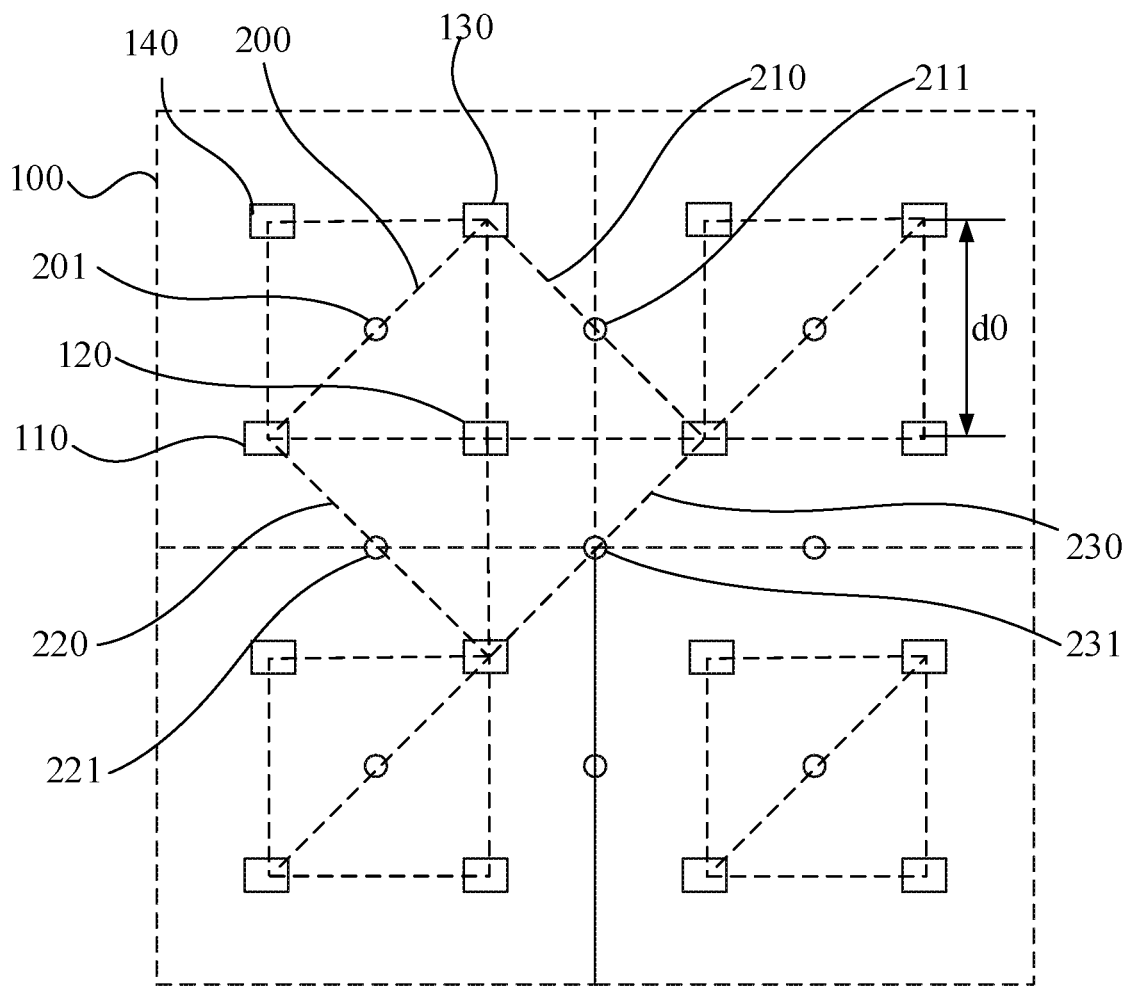
FIG. 2 shows a schematic diagram of a pixel structure according to another embodiment of the present application.

In an embodiment, as shown in FIG. 2, each pixel group may further comprises a fourth sub-pixel 140, where the centers of the first sub-pixel 110, the second sub-pixel 120, the third sub-pixel 130 and the fourth sub-pixel 140 are at four vertices of a virtual square, respectively, and two sub-pixels at two vertices on one diagonal of the virtual square emit light of same color. In this embodiment, for example, the second sub-pixel 120 and the fourth sub-pixel 140 emit light of the same color.

The above pixel structure uses the "virtual pixel" technology (i.e., a technology that uses the persistence of human eyes to time-multiplex real pixels to reproduce more virtual pixels). In the pixel structure 10, when the first sub-pixel 110, the second sub-pixel 120, the third sub-pixel 130, and the fourth sub-pixel 140 are lighted, the first pixel 201 is approximately at the geometric center of a virtual square formed by the first sub-pixel 110, the second sub-pixel 120, the third sub-pixel 130, and the fourth sub-pixel 140 as vertices.

Further, each of the first sub-pixel 110, the second sub-pixel 120, and the third sub-pixel 130 is a red light emitting chip, a blue light emitting chip, or a green light emitting chip, the first sub-pixel 110, the second sub-pixel 120, and the third sub-pixel 130 emit light of different colors, and the second sub-pixel 120 and the fourth sub-pixel 140 emit light of the same color. Therefore, when the pixel structure 10 displays a single color, it is displayed in a straight line, the centers of any two colors displayed mixedly are in a straight line, and the centers of the three colors displayed mixedly are aligned. In one pixel group 100, the sub-pixels that emit light of the same color at two vertices on one diagonal of the virtual square needs not to be lighted at the same time, and more pixels can be displayed by controlling time division multiplexing of the sub-pixels of the pixel group 100.

Further, the side length d0 of the virtual square formed by the first sub-pixel 110, the second sub-pixel 120, the third sub-pixel 130, and the fourth sub-pixel 140 as vertices ranges from 0.4 mm to 3 mm. Since the distance between the geometric centers of adjacent two pixel groups 100 is twice the side length of the virtual square, the pitch between real pixels may be 0.8 mm at the minimum, which is less than 0.9 mm, thereby obtaining a smaller pixel pitch. An embodiment of the present application further relates to a display panel comprising the pixel structure 10 described above.

Alternatively, the display panel may be an OLED (Organic Light-Emitting Diode) display panel, a COB display panel, an LED (Light Emitting Diode) display panel, or the like.

Specifically, the display panel is a COB display panel, and the first sub-pixel 110, the second sub-pixel 120, and the third sub-pixel 130 may be face-up or flip-chip light emitting chips.

Figure 3:
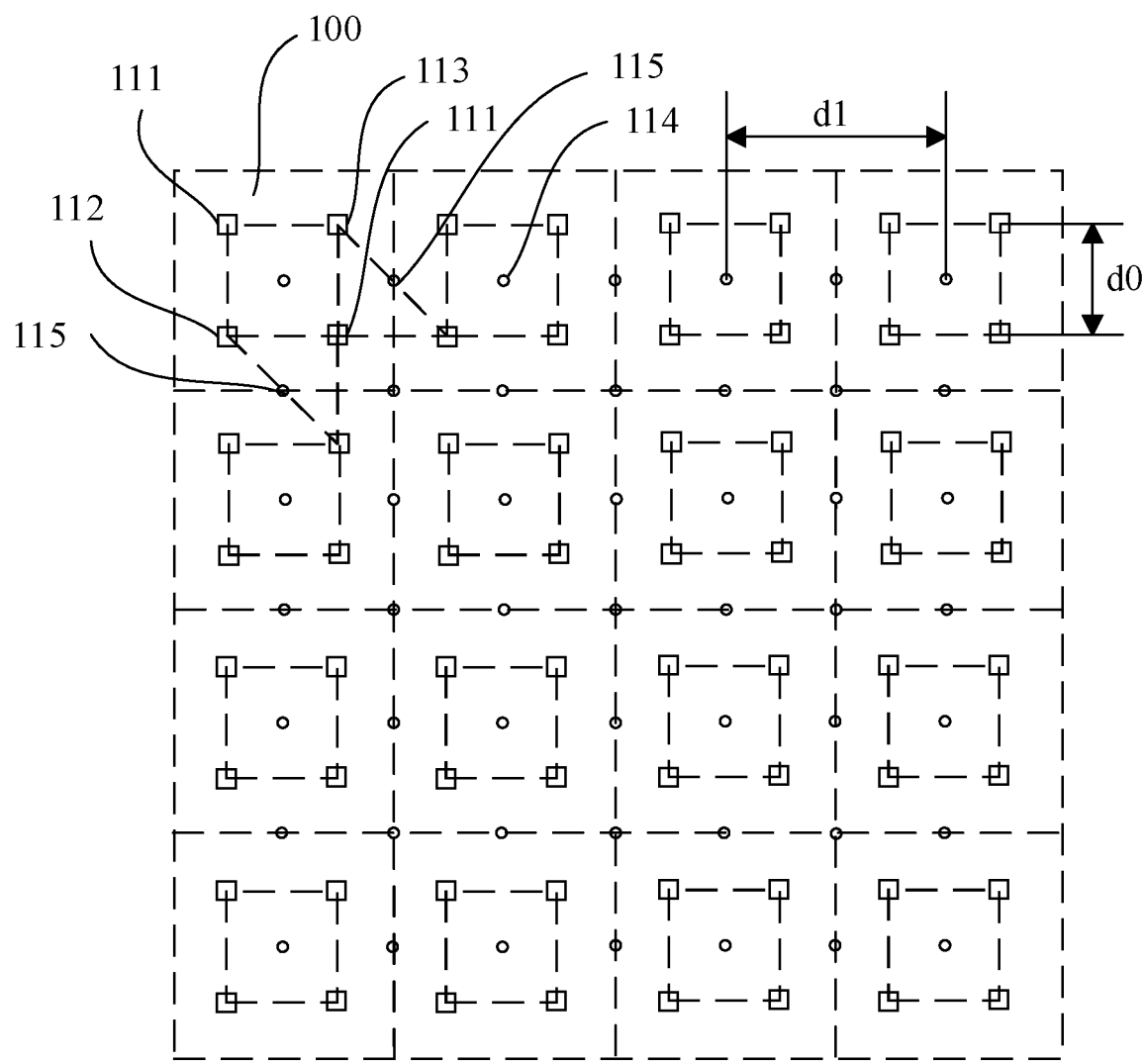
FIG. 3 shows a schematic diagram of a pixel structure of a display panel according to an embodiment of the present application.

As shown in FIG. 3, an embodiment of the present application further relates to a display panel. The display panel comprises a circuit board, and a plurality of pixel groups arranged in an array to form an array structure. Each pixel group comprises a first chip, a second chip and a third chip in a ratio of 2:1:1, and the first chip, the second chip and the third chip are formed on a same side of the circuit board through molding; in each pixel group, the first chip, the second chip and the third chip are at four vertices of a virtual square, respectively, and all the first chips are at two vertices on one diagonal of the virtual square; and the first chip, the second chip, and the third chip in each pixel group are arranged in the same manner.

Figure 4:
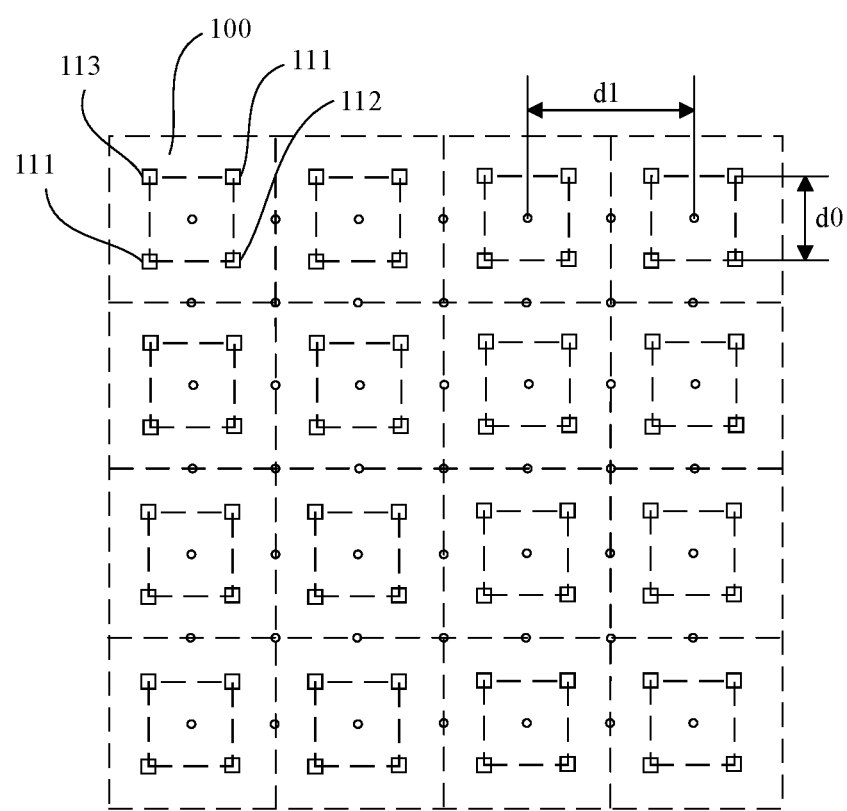
FIG. 4 shows a schematic diagram of a pixel structure of a display panel according to another embodiment of the present application.

Illustratively, the circuit board may be a PCB circuit board on which a plurality of pixel groups with the same internal arrangement are provided. FIG. 3 shows a schematic diagram of a pixel structure of a display panel according to an embodiment. FIG. 4 shows a schematic diagram of a pixel structure of a display panel according to another embodiment. As shown in FIGS. 3 and 4, each pixel group 100 comprises two first chips 111, one second chip 112, and one third chip 113. In other embodiments, each pixel group 100 comprises four first chips 111, two second chips 112, and two third chips 113, as long as it is guaranteed that the first chips 111, the second chips 112 and the third chips 113 are in a ratio of 2:1:1. Each of the first chip 111, the second chip 112, and the third chip 113 may be a red light emitting chip, a blue light emitting chip, or a green light emitting chip, and the first chip 111, the second chip 112, and the third chip 113 emit light of different colors.

Illustratively, the first chip 111 is a green light emitting chip, the second chip 112 is a red light emitting chip, and the third chip 113 is a blue light emitting chip. In each pixel group 100, the green light emitting chip, the red light emitting chip, and the blue light emitting chip are in a ratio of 2:1:1. Of course, it is also possible that the second chip 112 is a blue light emitting chip, and the third chip 113 is a red light emitting chip.

Illustratively, the first chip 111 is a red light emitting chip, the second chip 112 is a green light emitting chip, and the third chip 113 is a blue light emitting chip. In each pixel group 100, the red light emitting chip, the green light emitting chip, and the blue light emitting chip are in a ratio of 2:1:1. Of course, it is also possible that the second chip 112 is a blue light emitting chip, and the third chip 113 is a green light emitting chip.

Illustratively, the first chip 111 is a blue light emitting chip, the second chip 112 is a red light emitting chip, and the third chip 113 is a green light emitting chip. In each pixel group 100, the blue light emitting chip, the red light emitting chip, and the green light emitting chip are in a ratio of 2:1:1. Of course, it is also possible that the second chip 112 is a green light emitting chip, and the third chip 113 is a red light emitting chip.

Of course, the first chip 111, the second chip 112, and the third chip 113 may be light emitting chips of other colors.

For each pixel group 100, the first chip 111, the second chip 112, and the third chip 113 therein are formed on a same side of the PCB board through molding. As two first chips 111, one second chip 112 and one third chip 113 are at four vertices of a virtual square, the two first chips 111 are at two vertices on one diagonal of the virtual square, respectively, and one second chip 112 and one third chip 113 are at two vertices on the other diagonal line of the virtual square, respectively. The two first chips 111 in one pixel group are not lighted at the same time, and more pixels may be displayed by controlling time-division multiplexing of the chips in the pixel group 100.

Referring to FIG. 3, for two adjacent pixel groups 100 in a same row, each pixel group 100 may display a first virtual pixel 114 by controlling one of the first chips 111, one second chip 112, and one third chip 113. The first virtual pixel 114 is approximately at the geometric center of the virtual square formed by two first chips 111, one second chip 112 and one third chip 113 as vertices in the pixel group 100. In addition, the two adjacent pixel groups 100 display a second virtual pixel 115 by multiplexing real pixels, for example, lighting the first chip 111 and the third chip 113 of the left pixel group 100 and lighting the second chip 112 of the right pixel group 100, and the second virtual pixel 115 may be approximately at the circumcenter of the virtual triangle with the three chips as vertices, and of course, the second virtual pixel 115 may also be located inside the virtual triangle.

Similarly, for two adjacent pixel groups 100 in a same column, each pixel group 100 may display a first virtual pixel 114 by controlling one of the first chips 111, one second chip 112, and one third chip 113. The first virtual pixel 114 is approximately at the geometric center of the virtual square formed by two first chips 111, one second chip 112 and one third chip 113 as vertices in the pixel group 100. In addition, the two adjacent pixel groups 100 display a second virtual pixel 115 by multiplexing real pixels, for example, lighting the first chip 111 and the second chip 112 of the upper pixel group 100 and lighting the third chip 113 of the lower pixel group 100, and the second virtual pixel 115 may be approximately at the circumcenter of the virtual triangle with the three chips as vertices, and of course, the second virtual pixel 115 may also be located inside the virtual triangle.

The above display panel uses the "virtual pixel" technology (i.e., a technology that uses the persistence of human eyes to time-multiplex real pixels to reproduce more virtual pixels). In the display panel, two adjacent pixel groups 100 in a same row or column may form a first virtual pixel 114, and a second virtual pixel 115 may also be formed between two adjacent pixel groups 100 by multiplexing the chips in the two pixel groups 100. In this way, under the condition that the display panel has the same number of sub-pixels as a real pixel display panel, the resolution of the display panel can be improved, and therefore the cost of the display panel is reduced; besides, the use of virtual pixels can also reduce user fatigue when watching.

In addition, when each pixel group 100 comprises two first chips 111, one second chip 112, and one third chip 113, and the number of the pixel groups 100 in the pixel array is large enough, with the same number of chips, the display panel may achieve a display effect four times that of real pixels. That is, the display panel may use one-half less chips than the conventional display panel with the same resolution, thereby also reducing the use of driving chips.

Alternatively, when real pixels are time-division multiplexed, a sub-pixel algorithm may also be used to reduce the sharpness of edges of an image displayed on the display panel.

In an embodiment, all pixel groups 100 in a same row in the array structure are arranged at even intervals, and all pixel groups 100 in a same column in the array structure are arranged at even intervals, so that the overall distribution of the first virtual pixels 114 and the second virtual pixels 115 on the display panel is more uniform, thereby further reducing user fatigue when watching.

Specifically, still referring to FIG. 3, in the row direction of the array structure, the third chip 113 and one of the first chips 111 in the pixel group 100 are in a same row, and the second chip 112 and the other first chip 111 in the pixel group 100 are in a same row; and in the column direction of the array structure, the second chip 112 and one of the first chips 111 in the pixel are in a same column, and the third chip 113 and the other first chip 111 in the pixel group 100 are in a same column.

Further, the distance dl between the geometric centers of two adjacent pixel groups 100 is twice the side length do of the virtual square, i.e. the distance between the closest two chips in two adjacent pixel groups 100 is equal to the distance between the closest two chips in one pixel group 100. In this embodiment, part of the first chips 111 in the pixel groups 100 in the array structure are in a straight line, and part of the second chips 112 and the third chips 113 in the pixel groups 100 are also in a straight line. In addition, the first virtual pixels 114 and the second virtual pixels 115 are arranged at intervals, and distances between adjacent first virtual pixels 114 and second virtual pixels 115 are equal. Therefore, the overall distribution of the virtual pixels on the display panel is more uniform.

Illustratively, the side length do of the virtual square formed by the two first chips 111, one second chip 112 and one third chip 113 as vertices in the pixel group 100 ranges from 0.4 mm to 3 mm. Then, the distance between the centers of adjacent two pixel groups 100, i.e., the centers of mixed light, is twice the range, so that the pitch between the real pixels may be 0.8 mm at the minimum.

In an embodiment, the first chip 111, the second chip 112 and the third chip 113 each comprises a face-up light emitting chip or a flip-chip light emitting chip, and the face-up light emitting chip or the flip-chip light emitting chip is selected according to actual needs.

Figure 5:
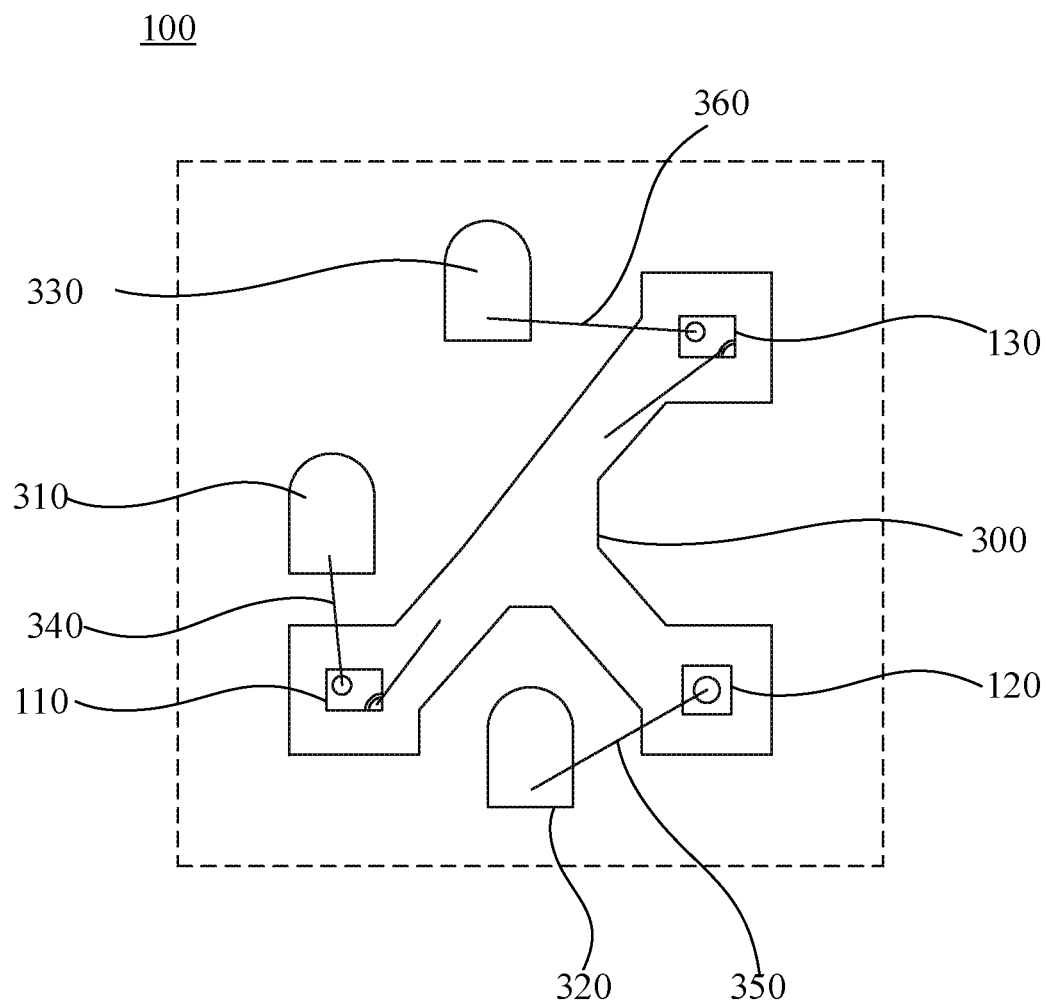
FIG. 5 shows a schematic diagram of a chip and wire bonding structure of a pixel group according to an embodiment of the present application.

As shown in FIG. 5, in an embodiment, in one pixel group 100, the first sub-pixel 110, the second sub-pixel 120, and the third sub-pixel 130 are of face-up structure, the first sub-pixel 110, the second sub-pixel 120, and the third sub-pixel 130 are fixed to a common electrode 300 with a chip bonding adhesive, a first bonding wire area 310, a second bonding wire area 320 and a third bonding wire area 330 are all spaced apart from the common electrode 300, the first sub-pixel 110 is electrically connected to the first bonding wire area 310 through a first bonding wire 340, the second sub-pixel 120 is electrically connected to the second bonding wire area 320 through a second bonding wire 350, and the third sub-pixel 130 is electrically connected to the third bonding wire area 330 through a third bonding wire 360. Therefore, the bonding wire areas are spaced part from the chip bonding adhesive, so that the quality of the bonding wires is guaranteed.

Figure 6:
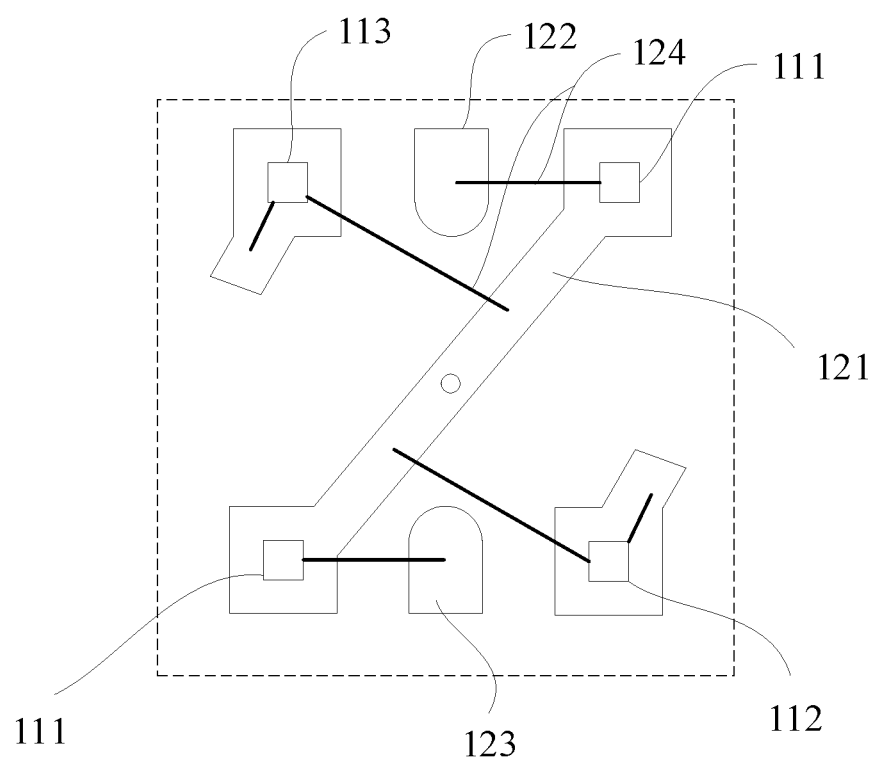
FIG. 6 shows a schematic diagram of a chip and wire bonding structure of a pixel group according to an embodiment of the present application.

As shown in FIG. 6, in another embodiment, in one pixel group 100, the first chip 111, the second chip 112, and the third chip 113 are of face-up structure, two first chips 111 are fixed to a common electrode 121 by a chip bonding adhesive, a first bonding wire area 122 is provided between the first chip 111 and the third chip 113, a second bonding wire area 123 is provided between the other first chip 111 and the second chip 112, the two first chips 111 are independently connected to the first bonding wire area 122 and the second bonding wire area 123 through bonding wires 124, and the second chip 112 and the third chip 113 are both connected to the common electrode 121 through bonding wires 124. In this embodiment, the first bonding wire area 122 and the second bonding wire area 123 are located on both sides of the chip bonding adhesive, so that the bonding wire areas are spaced apart from the chip bonding adhesive, which is beneficial to ensure the quality of bonding wires.

Based on the same concept as the pixel structure 10 and the display panel described above, an embodiment also relates to a display device comprising the display panel as described above.

Alternatively, the display device may be a digital device such as a display screen, a cell phone, a tablet, a palmtop computer, a smart watch, etc.

The technical features of the above-mentioned embodiments may be combined in any combination, and for simplicity of description, not all possible combinations of the technical features of the above-mentioned embodiments are described, however, as long as there is no conflict between these technical features, they should be considered to be within the scope of the description.

The embodiments described above only express several embodiments of the present application, which description is more specific and detailed, but is not to be construed as limiting the scope of the application. It should be noted that several variations and modifications may be made by those skilled in the art without departing from the spirit of the present application, which are within the scope of the invention. Accordingly, the scope of protection of the patent application should be set forth in the appended claims.

The invention claimed is:

1. A display panel, comprising a circuit board, and a plurality of pixel groups arranged in an array to form an array structure; each pixel group comprises two first chips, a second chip, and a third chip in a ratio of 2:1:1, and the two first chips, the second chip and the third chip are formed on a same side of the circuit board;

in each pixel group, the two first chips, the second chip, and the third chip are at four vertices of a virtual square, respectively, and all the first chips are at two vertices on one diagonal of the virtual square; and the two first chips, the second chip, and the third chip in each pixel group are arranged in the same manner, wherein the plurality of pixel groups include a first pixel group and a second pixel group, two neighboring pixel groups in a same column, the first and second pixel groups displaying a virtual pixel by multiplexing one of the first chips and the second chip in the first pixel group with the third chip in the second pixel group, the virtual pixel being approximately at a circumcenter of a triangle formed with the one of the first chips in the first pixel group, the second chip in the first pixel group, and the third chip in the second pixel group as vertices.

2. The display panel of claim 1, wherein all the pixel groups in the array structure are arranged at even intervals in a row direction, and all the pixel groups in the array structure are arranged at even intervals in a column direction.

3. The display panel of claim 1, wherein the virtual square has a side length ranging from 0.4 mm to 3 mm.

4. The display panel of claim 1, wherein each of the first chip, the second chip and the third chip is a red light emitting chip, a blue light emitting chip, or a green light emitting chip, and the first chip, the second chip, and the third chip emit light of different colors.

5. A display device, comprising the display panel according to claim 1.

6. A display device, comprising the display panel according to claim 2.

7. A display device, comprising the display panel according to claim 3.

8. A display device, comprising the display panel according to claim 4.

9. The display panel according to claim 1, wherein the first pixel group displays another virtual pixel at a geometric center of a virtual square formed by the two first chips, the second chip, and the third chip of the first pixel group, by controlling one of the first chips, the second chip, and the third chip of the first pixel group.

* * * * *